Dec. 29, 1959

G. HAUMANN 2,918,951

CONTROL MECHANISM FOR LUMBER PROCESSING

Filed June 11, 1957

INVENTOR.
George Haumann
BY
Ramsey and Kolisch
Attys.

Dec. 29, 1959     G. HAUMANN     2,918,951
CONTROL MECHANISM FOR LUMBER PROCESSING
Filed June 11, 1957     5 Sheets-Sheet 2

INVENTOR.
George Haumann
BY
Ramsey and Kolisch
Attys.

Dec. 29, 1959 G. HAUMANN 2,918,951
CONTROL MECHANISM FOR LUMBER PROCESSING
Filed June 11, 1957 5 Sheets-Sheet 3

INVENTOR.
George Haumann
BY
Ramsey and Kolisch
Attys.

Dec. 29, 1959   G. HAUMANN   2,918,951
CONTROL MECHANISM FOR LUMBER PROCESSING
Filed June 11, 1957   5 Sheets-Sheet 4

INVENTOR.
George Haumann
BY
Ramsey and Kolisch
Attys.

CONTROL MECHANISM FOR LUMBER PROCESSING

George Haumann, Portland, Oreg., assignor to Irvington Machine Works, Inc., a corporation of Oregon Application June 11, 1957, Serial No. 664,953

7 Claims. (Cl. 144—3)

This invention relates to control mechanism for a lumber processing line and more particularly to control mechanism for a processing line, having a number of motors spaced along the line for performing work operations on a piece of lumber, operable to activate selected motors in the line as determined by an operator running the control mechanism.

The invention is characterized by a novel construction which enables the operator to select a combination of motors for activation by the actuation of a single selector member or key. The selection of a particular combination depends upon the particular type of lumber being processed. The control mechanism not only accommodates such a selection but also is provided with an overriding or annul means, periodically canceled during operation of the control mechanism, which enables one of the combination of motors selected for activation to be temporarily removed from the combination.

In the processing of lumber, typically a number of work operations are performed between the time the lumber is first cut and the time the lumber is ready for shipment to the ultimate consumer. For instance, common operations performed on lumber include planing, trimming, grading, stamping, sorting, tallying, etc. With the decrease in the supply of quality timber, and the increasing demand for better and better products, the number of work operations performed on a piece of lumber has tended to steadily increase in recent years. Since many operations require that they be preceded by a visual inspection, this has steadily increased the cost of manufacture.

It has been found that an efficient plant operation can best be realized if the various inspections required to determine grade, length, direction, etc., are consolidated so that the inspections are performed at a single inspection station located in the processing line for the lumber. This reduces the number of inspectors needed and also functions to speed up processing of the lumber. While the advisability and advantages of having consolidated inspections have been apparent, the inadequacies of control mechanisms known heretofore have held back widespread adoption of such a system.

A study of lumber plant operations has revealed that lumber pieces processed in a plant tend to align themselves in groups, with the pieces in each group requiring substantially the same treatment to produce a finished product. It is the uncommon or exceptional board in each group which needs special treatment peculiar to that board and not required of the remainder. By way of example, considering a processing line having a bank of selectively operated trimmer saws for cutting lumber into selected lengths and a sorter mechanism controlling the direction of the lumber as it travels from the trimmer saws, in the normal operation the sorter mechanism might be operated in accordance with the length of the trimmed lumber produced by the trimmer saws. For instance, all boards over ten feet might be sent by the sorter mechanism in one direction, and all boards ten feet and under might be sent in another direction. Or, in a processing line having a multiple number of grade stamping machines and a sorter mechanism controlling direction of the lumber, the sorter mechanism might be operated depending upon the grade selected. In the foregoing cases, the boards fall into separate groups, depending upon length and grade, respectively. While the particular trimmer saw activated in the first instance and the particular grade stamper activated in the second instance ordinarily would vary from board to board, the direction of each group of boards remains the same.

It is an object of this invention to provide a novel control mechanism regulating plural motors performing work operations on lumber wherein the control mechanism has a number of selector members or keys each independently actuatable for activating one of the motors, the adjustment brought about by the selector keys being periodically canceled to enable successive pieces of lumber to be treated independently, the control mechanism also including selectively adjustable noncanceling coupling means connecting the operation of the keys so that a combination of motors may be activated by actuating a single selector member or key. The coupling means are noncanceling so that successive pieces of lumber having characteristics commonly shared by others of a class or group are subjected to the same treatment as other pieces in the group. A control mechanism of this type enables an operator rapidly and accurately to set up the motors in a line which are to be activated without having manually to actuate an excessive number of keys. It is this aspect which renders the mechanism of this invention so highly effective since only through reducing the number of actuations which must be made by an operator can efficient inspection and control be obtained.

While, as a general rule, lumber pieces in passing through a processing line divide themselves into classes or groups, with each board of a group requiring treatment similar to other boards in the group, it has also been found that occasionally a piece of lumber is processed which demands treatment peculiar to the individual board. For instance, it is common to plane two sides of a board and roughly determine the grade of the board prior to storage. Subsequently, when the lumber is finally planed, trimmed, and graded, a small percent of the boards in a stack roughly graded will be off-grade. In a line having trimmer saws, grade stamping machines and a sorting mechanism, if the operation of the trimmer saws is coupled to the operation of the sorting mechanism, it is quite advantageous to be able to annul or override the coupling of the two operations to take care of those boards that are off-grade.

Another object of this invention, therefore, is to provide control mechanism for a lumber processing line of the type described which includes means for overriding or annulling the coupling of various motors coupled for operation as a combination wherein a motor may be removed from activation with the combination.

A related object is to provide such a control mechanism having an overriding or annul means of the type described wherein the overriding means is canceled periodically, so that the control mechanism returns to its original condition after the uncommon board leaves the processing line.

Typically in a lumber mill, the various work stations performing work on the lumber are spaced along the line so that a board passes through the stations at spaced time intervals. It is important that operation of a particular work station continues only for so long a time as is necessary to treat the board passing through the station. In this way, a plural number of lumber pieces may be transported down the processing line, with the motors of the various work stations being activated as required by each particular board. It is therefore an object of the invention to provide a control mechanism of the type hereinabove described wherein the motors set for activation by the selector keys or selector members are activated only for so long a time as is necessary to treat a board transported down the line, the activation of the motors being co-ordinated with the passage of the board down the line.

These and other objects and advantages are attained by the present invention which is described hereinbelow in conjunction with the accompanying drawings wherein.

The invention hereinbelow is described in conjunction with a processing line having a bank of trimmer saws, a pair of end printers for placing a mark on each end of a board, a bank of grade stampers, and a sorting mechanism controlling the direction of a piece of lumber. It should be obvious that other machines could be incorporated into the line such as branders, painters, profile saws, paraffin coaters, tally keepers, etc. The number and type of work stations included in a line would depend in any given case upon the particular type of lumber mill operation.

Figure 1:
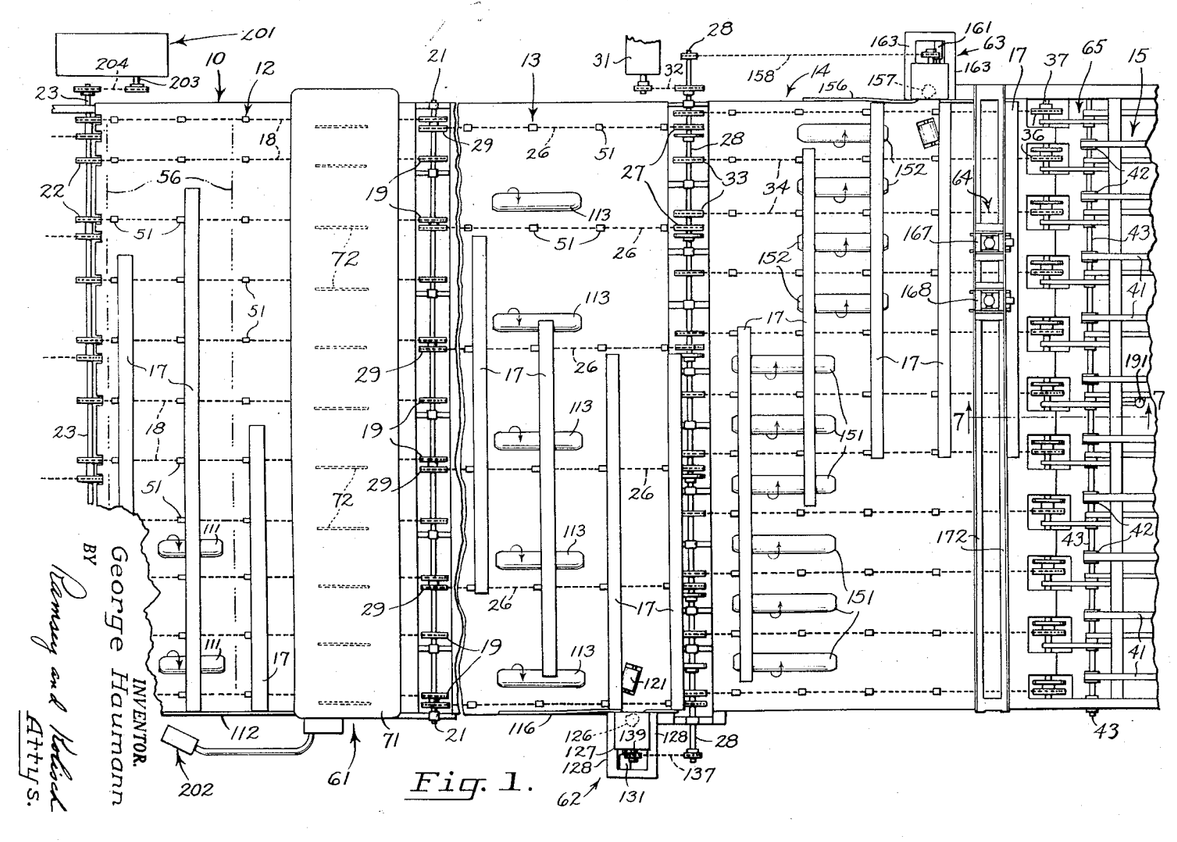
Fig. 1 is a top view of a lumber processing line having a number of work stations including a bank of trimmer saws, end printers, a series of grade stampers, and a sorter mechanism, arranged at intervals along the line.

Referring to the drawings wherein an embodiment of this invention is illustrated, and more particularly to Fig. 1, 10 indicates the processing line generally, having frame structure supporting a series of transfer mechanisms indicated at 12, 13, 14, and 15, respectively, transporting boards indicated at 17 along a path or way through the processing lines.

Transfer mechanisms 12–15 are conventional in construction. In the embodiment illustrated, transfer mechanism 12 includes a number of feed chains 18 reeved at their forward ends about a series of sprockets 19 which are affixed to a shaft 21, and reeved at their rear ends about sprockets 22 mounted on a shaft 23. Sprockets 22 are rotatably mounted on tail shaft 23 save for one of the sprockets which is affixed to the shaft for transmitting drive from the shaft 21 to shaft 23. In this way, shaft 23 may be used for rotating sprockets affixed thereto, engaging and rotating simultaneously with the shaft chains transporting lumber pieces or boards into transfer mechanism 12.

Transfer mechanism 13, which is located forwardly of transfer mechanism 12, comprises a number of chains 26 engaging at their forward ends a series of sprockets 27 which are affixed to a driven shaft 28. The rear ends of chains 26 are reeved about and engage sprockets 29 rotatably mounted on shaft 21 save for one of the sprockets which is affixed to shaft 21 and transmits drive from driven shaft 28 to shaft 21. Driven shaft 28 may be driven in any suitable manner, as by electric motor 31 connected to the driven shaft by chain 32.

Transfer mechanism 14, comprised of a series of chains 34, is driven simultaneously with transfer mechanism 13 by means of sprockets 33 affixed to the driven shaft and engaging chains 34. The forward ends of chains 34 are reeved about and engage sprockets 36 rotatably mounted on a shaft 37 carried at the forward end of the line.

Transfer mechanism 15 at the outfeed or forward end of the processing line comprises a series of belts 41 reeved about pulleys 42 rotatably mounted on a shaft 43. Belts 41 may be driven in any conventional manner (not shown). Thus transfer mechanisms 12–15 provide a conveyer mechanism for transporting lumber pieces longitudinally through the line.

Referring again to Fig. 1, chains 18, 26, and 34 of transfer mechanisms 12–14 are each provided with a series of lug members 51 affixed to the chains and spaced thereon at intervals. The lug members carried by the chains are aligned with each other in a series of rows, each row of lug members being operable to transport a piece of lumber through the line. The lumber pieces are transported by the lug members and chains edgewise and in a direction extending transversely of their length longitudinally through the line.

At the rear or infeed end of the line is an inspection station indicated generally by the dotted lines 56. The inspection station is followed by a series of work stations indicated generally at 61, 62, 63, 64, and 65. In the embodiment illustrated, work station 61 comprises a bank of automatic and selective trimmer saw machines, work stations 62 and 63 take the form of end printers for affixing a mark to opposite ends of a piece of lumber, work station 64 is comprised of a series of grade stamping machines positioned over the lumber as it passes down the line and operable to impart a grade stamp to the top side of a board piece, and work station 65 comprises a sorter mechanism controlling the direction of a board when it leaves the line.

The bank of trimmer saws in work station 61 may take any conventional form. Referring to Fig. 1, the work station shown includes a hood structure 71 overlying a gang of power-driven saw mechanisms, indicated in Fig. 1 by the dotted outlines 72, which represent the saws in the trimmer saw machine. Conventionally, a trimmer saw machine may have a plurality of power-driven, circular saws arranged in a bank with means for adjusting one or more saws so that when a board passes beneath the bank, the saw or saws selected engages and cuts into the board. Each of the circular saws is provided with an associated rider wheel, spaced laterally from the wheel and having a somewhat larger diameter than the saw. Each saw and its rider wheel are connected together by a detachable latch mechanism. If a piece of lumber is to pass beneath the saw without being cut, the rider wheel and saw are left connected so that the wheel rides over and lifts the saw from the lumber, preventing the saw from cutting the lumber. On the other hand, if a cut is to be made, the saw is disconnected from its rider wheel and the lumber is severed by the saw while the rider wheel rides independently over and across the lumber. Reference is made to United States Patent No. 2,711,197, issued to Edwin W. DeKoning, June 21, 1955, illustrating an automatic and selective trimmer saw mechanism, for a description of a trimmer saw machine of this type.

Figures 4, 5, 6:
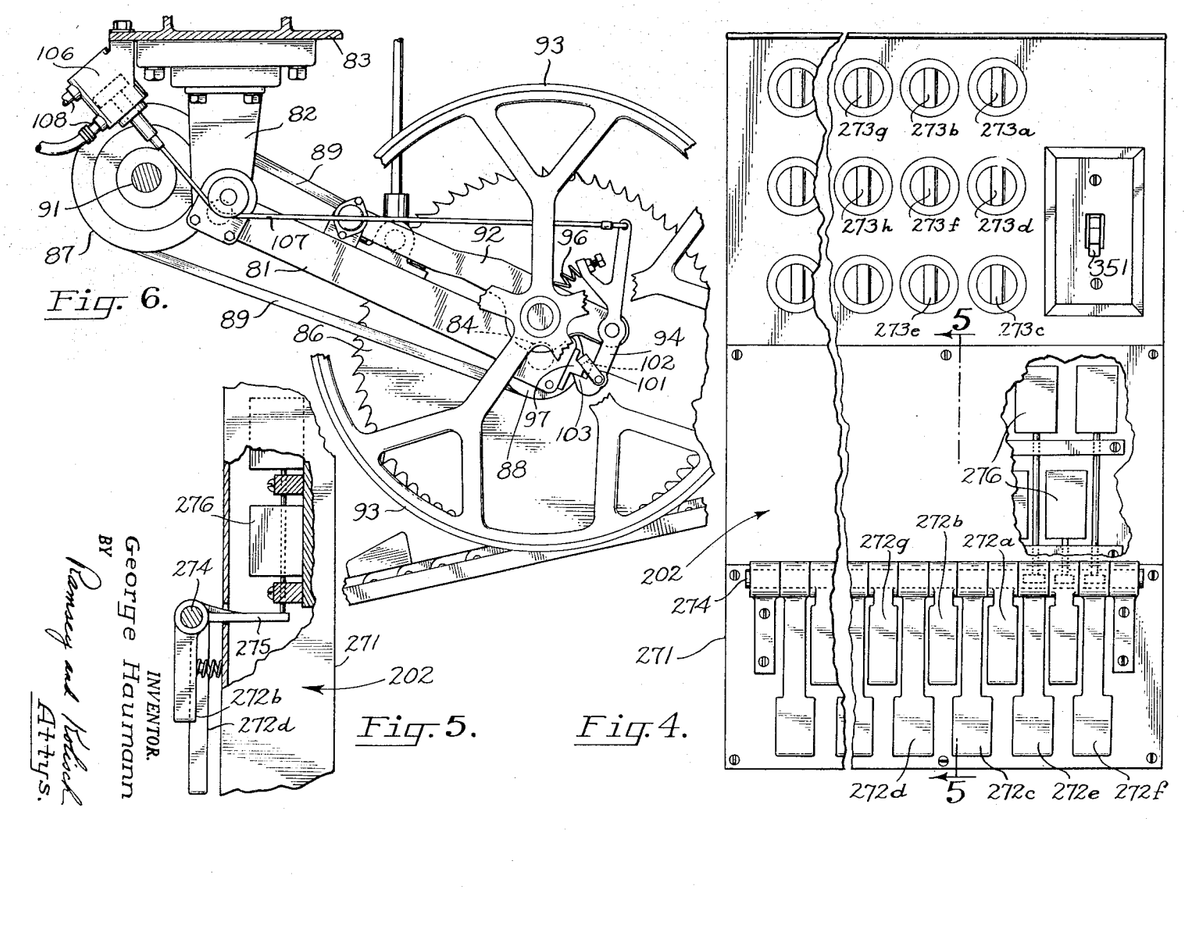
Fig. 4 is a top view of the control box mounting the selector keys or selector members and the coupling switches employed in the invention.
Fig. 5 is a section view along the line 5—5 in Fig. 4.
Fig. 6 is a side view of a selectively operable trimmer saw of a type which may be used in the processing line illustrated in Fig. 1.

Briefly, referring to Fig. 6, each of the power-driven, circular saws in the bank of saws is supported on a ladder 81 swingably mounted as by brackets 82 to frame member 83 extending transversely across the line. Ladder 81 carries at its free end a saw arbor 84 mounting a circular saw 86. The saw is driven as by pulleys 87, 88 and belt 89 driven by a drive shaft 91. An auxiliary arm 92 pivotally secured to the ladder intermediate its ends rotatably carries at its free end a rider wheel 93.

Circular saw 86 is detachably connected to auxiliary arm 92 so that the saw either rides up over a piece of lumber with the wheel, or, if detached therefrom, the rider wheel moves up and is pivoted on arm 67 independently of the saw as the saw passes through a piece of lumber. To this end, a latch member 94 is pivoted on the outer end of arm 92, the latch member pivoting in a counterclockwise direction against the bias of a spring 96 to release the saw from the rider wheel, the latch member swinging clear of a keeper 97.

Means are provided for holding the latch member out out of engagement with the keeper once the latch member has been adjusted to a release position to enable the rider wheel to move independently of the saw. To this end, a bail or shield 101 is pivoted on the lower end of the latch member which is operable to swing down between the latch member and the keeper once the latch member is moved to a release position with the end of the bail abutting against the forward end of the keeper. A shoulder 102 at the forward end of the bail strikes a protrusion 103 of the latch member when the latch member is disengaged from the keeper and the bail is free to move downwardly, preventing the bail from swinging over and beyond protrusion 103. The construction described automatically permits the resetting of the bail or shield above the latch member to the position illustrated in Fig. 6 after an operating cycle since relative movement of arm 92 upwardly relative to the ladder supporting the saw functions to move the end of the bail member out of end engagement with the end of keeper 97. This enables spring 96 to swing the latch member in a clockwise direction in Fig. 6 so that upon the return movement of the rider wheel, the parts assume the position illustrated in Fig. 6.

A fluid operated motor 106, which may be a conventional double-acting piston-cylinder having fluid inlet and exhaust conduits 108, is provided for moving the latch member from the position shown in Fig. 6, which is the inoperative position for the saw mechanism, out of engagement with the keeper, which constitutes the operative position of the saw mechanism. Motor 106 acts upon a cable 107 connected to latch member 94. From the arrangement described, it will be apparent that each of the saw mechanisms in the bank of saws or work station 61 may be placed in operative position by a momentary activation of motor 106, the latch member, once it is moved out of engagement with the keeper, remaining out of engagement until the saw goes through an operating cycle and swings back into inoperative position.

Transfer mechanism 12 is also provided with a series of crowding rolls 111 tapered at their forward ends to allow pieces of lumber to ride over these ends and operable to exert a sideways thrust on the lumber pieces. These crowding rolls are rotated in the direction of the arrows in Fig. 1 by suitable motor means (not shown) to force the end of a board against a fence 112 disposed along one side of the processing line. The fence positions the boards so that they will be trimmed into appropriate lengths as they pass through the bank of trimmer saws of work station 61.

It will be noted that the chains 18 in transfer mechanism 12 are spaced closer together than the chains 26 of transfer mechanism 13 at the outfeed end of work station 61. This is to enable the trimmings produced by the trimmer saws to drop out of the processing line. Between work station 61 and work station 62, chains 26 conventionally may pass over a drop chute which collects the short trimmings produced in station 61 which drop out of the line. The longer pieces, which are to be further processed, are transported forwardly by chains 26 to work station 62. The drop chute has not been shown in Fig. 1 since a discussion of the chute is not considered material in the understanding of this invention.

Positioned intermediate the ends of transfer mechanism 13 are a second series of crowding rolls 113. Rolls 113, as in the case of rolls 111, are operable, upon rotation by a motor means (not shown) in the direction indicated by the arrows in Fig. 1, to move lumber pieces sideways in the apparatus, forcing boards against a fence 116 situated at one side of the line. Thus, drive chains 26, working in conjunction with the crowding rolls, feed boards one at a time through the work station 62 located to one side of the line forwardly of work station 61.

A roller 121 acts to grip the end of a board when it moves past work station 62. Conventionally, a pair of opposed rollers are employed, roller 121 co-operating with an upper roller spaced above roller 121 and in alignment therewith to grip the end of a board. The upper roller is not illustrated in Fig. 1 for reasons of clarity. The rollers are normally disposed at an oblique angle, that is, they are canted somewhat toward the outward edge of the table. Their contact surfaces are parallel to the plane of the upper surface of the table underlying chains 26. The rollers are spaced apart a distance somewhat less than the thickness of the boards and are coated with a soft material such as rubber to yieldably but frictionally grasp the boards as they are moved past work station 62. The rollers are not driven but idle, serving only to restrain longitudinal movement of the board away from the work station. Transfer mechanism of the type hereinabove described is disclosed more fully in United States Patent No. 2,778,474, issued January 22, 1957 to Edwin W. DeKoning, and entitled "Multidirectional Lumber Transfer Mechanism and Method."

Figure 8:
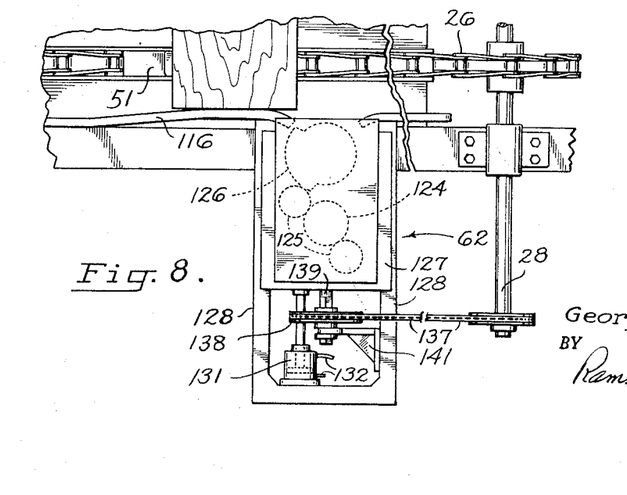
Fig. 8 is a top view of an end printer used in the line.

Referring to Fig. 8, work station 62 comprises an end printer having a rotatable die member 126 operable to contact the end of a board and impress thereupon a mark. Co-operating with the die member are a pair of smear rolls 125 and an ink reservoir 124 distributing ink to the smear rolls from whence ink is deposited on die member 126. The die member is mounted in a suitable housing 127 which in turn is slidably mounted on a pair of rails 128. A double-acting fluid motor 131, having inlet and exhaust conduits 132 operatively interposed between the pair of rails, which are fixed, and slidably mounted housing 127, functions when activated to slide the housing together with the die member either toward or away from the end of a piece of lumber passing the work station. Thus, during the forward stroke of the piston of motor 131, housing 127 is moved inwardly so that a lumber piece in passing the work station engages the die member thereby to be marked. Return or retracted movement of the piston operates to draw the housing and die member rearwardly on rails 128 and to move the die member out of engagement with a board passing the work station. Rotation of the die member is co-ordinated with the rotation of drive shaft 28 and movement of lugs 51 so that the die member will be in a correct position to mark a board when the board moves past the die member. In the construction shown, a chain 137 driven by drive shaft 28 is reeved about a sprocket 138 slidable on but spline connected to a shaft 139. Shaft 139 is geared to the die member and rotates the same. The sprocket may be secured against sliding movement with housing 127 by means of a retaining bracket 141 affixed to the rails and rotatably carrying at its outer end sprocket 138. The end printing mechanism may take any conventional form, the particular construction selected not being material to this invention.

A piece of lumber, on leaving transfer mechanism 13, is carried by transfer mechanism 14 past work station 63, which may take the form of a second end printer for affixing a mark to the other end of the lumber piece. A series of crowding rolls 151 and 152, tapered at the forward ends and rotated in the direction shown in Fig. 1, exert a sidewise thrust on boards transported by transfer mechanism 14 so that the boards are carried into work station 63.

Work station 63 is similar to work station 62, save for the fact that it is located on the other side of the processing line. As illustrated, the work station includes a fence 156, a rotatable die member 157, and a chain 158 rotating the die member. A double-acting piston-cylinder 161 is operable to move the housing for die member 157 to-and-fro along rails 163. Motor 161, when activated to its forward or extended position, thrusts the housing and die member 157 into end engagement with a board passing the work station. When the motor is activated to its retracted position, die member 157 is withdrawn from the side of the table rearwardly of fence 156, enabling the end of a piece of lumber to pass the work station without being marked.

Figure 7:
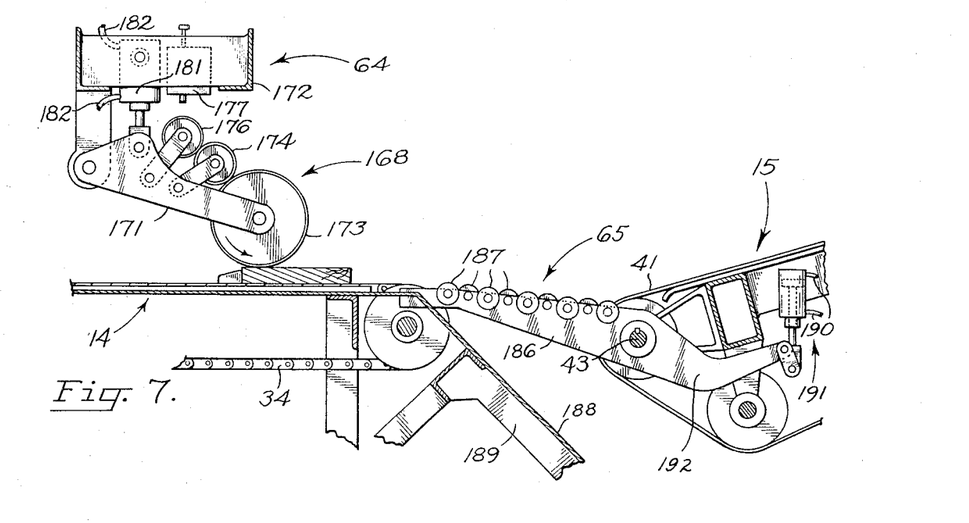
Fig. 7 is a side section view of a portion of the line showing the grade stampers and sorter mechanism.

Work station 64, located in processing line 10 forwardly of work station 63, comprises a series of grade stamper machines each operable when activated to affix a grade stamp on the top side of a board transported down the line. Only two grade stampers are illustrated in the drawings, indicated at 167 and 168. It should be obvious that any number of grade stampers could be employed depending upon the number of grade classifications used. Referring to Fig. 7, each of the grade stampers comprises a bifurcated arm 171 pivotally mounted to a transverse frame member 172. Arm 171 rotatably carries at its outer end a die member 173, which affixes the grade stamp to a board. In rolling contact with die member 173 and supported by the arm above the die member is a spreader roll 174. Roll 174 spreads and distributes ink from a rotatably mounted felt-covered roll 176 rolling against spreader roll 174 above the spreader roll. Ink is deposited on roll 176 by dripping down on the roll through a small aperture formed in the bottom of an ink reservoir 177. The die member of each grade stamper is raised and lowered from contact with the upper surface of a board passing thereunder by means of a double-acting fluid motor or piston-cylinder 181 having inlet and exhaust conduits 182. Upon activation of piston-cylinder 181 and extension of the piston in the motor, arm 171 is pivoted downwardly so that the die member contacts a board transported past the work station. Upon the return stroke of the motor, the free end of arm 171 is raised upwardly and die member 173 is moved out of contact with the board.

Work station 65 is located forwardly of work station 64 and comprises a drop sorting mechanism for separating various boards, i.e., for controlling the direction of the boards. Referring to Figs. 1 and 7, the drop sorting mechanism illustrated comprises a series of arms 186 affixed to shaft 43 for movement therewith and extending rearwardly of shaft 43 with their free ends slightly below the support plane defined by the upper portions of chains 34. Each of the arms carries a series of rollers 187 rotatably mounted in the arms and operable to roll down a board transported onto the arms by chains 34 onto belts 41 of transfer mechanism 15.

Beneath the arms and extending at an oblique angle downwardly from the forward ends of chains 34 is a chute 188 comprised of a metal sheet secured to frame structure 189. When the free ends of the arms are raised, lumber pieces coming off of chains 34 fall down the chute and below belts 41. When the arms are lowered to the position shown in Fig. 7, lumber pieces roll down rollers 187 to the belts.

Movement of the arms is brought about by means of a double-acting fluid motor 191 having inlet and exhaust connections 190. The piston rod of motor 191 is pivotally connected to an extension 192 of one of the arms. Activation of motor 191 and extension of the piston rod of motor 191 operates to raised arms 186 by rotating shaft 43 in a clockwise direction in Fig. 7, whereas retraction of the rod of the motor serves to lower the arms.

Five work stations are provided in the processing line herein disclosed, the work stations including a bank of trimmer saws, a pair of end printers, a bank of grade stamping mechanisms, and a drop sorting mechanism. The bank of trimmer saws as well as the bank of grade stamping mechanisms are each comprised of a plurality of work motors, each motor being individually activatable, whereas the end printers and the drop sorting mechanism in the embodiment illustrated each include only a single fluid motor. The control mechanism of this invention is operable to activate selected fluid motors in any one or all of the work stations, the fluid motor or motors which are to be activated for any given board being selected when the board passes the inspection station 56. While a motor which is to be activated is selected when a board passes the inspection station, the motor is not actually activated until the particular board which has been inspected passes into the vicinity of the work station which includes the motor set for activation. This enables a series of boards to be processed in the line at one time without the selections made for one board interfering with the selections made for another board.

The control mechanism of this invention includes a regulator unit, illustrated in outline at the upper left-hand portion of Fig. 1 and indicated at 201, and a selector box or selector unit shown in outline at the lower left-hand portion of Fig. 1 and indicated at 202. The selector unit contains the selector members which control the operation of the regulator unit.

Figure 2:
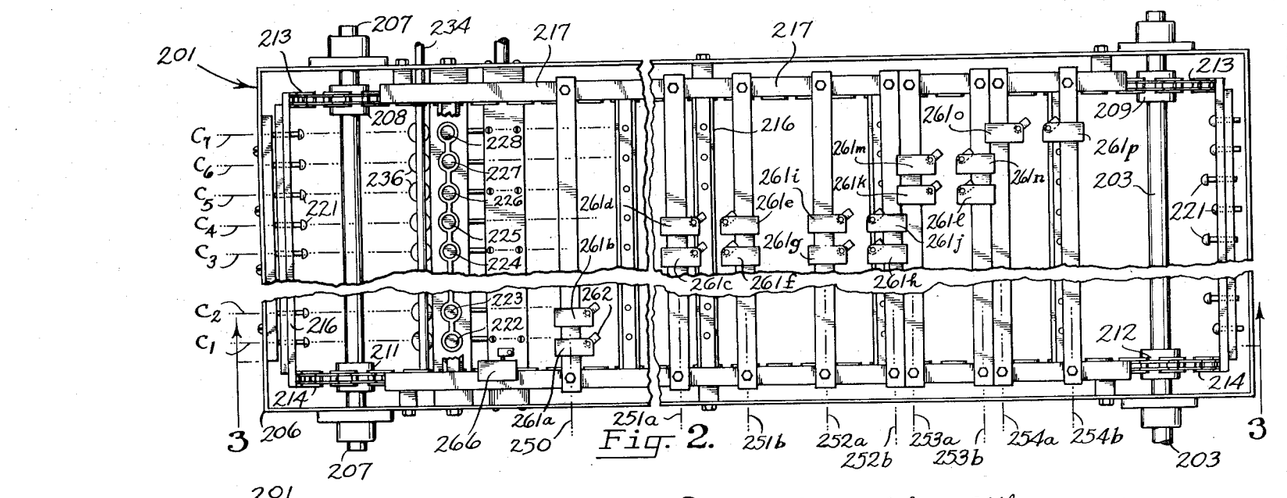
Fig. 2 is a top view of a regulator unit such as may be used in the control mechanism of the invention.
Figure 3:
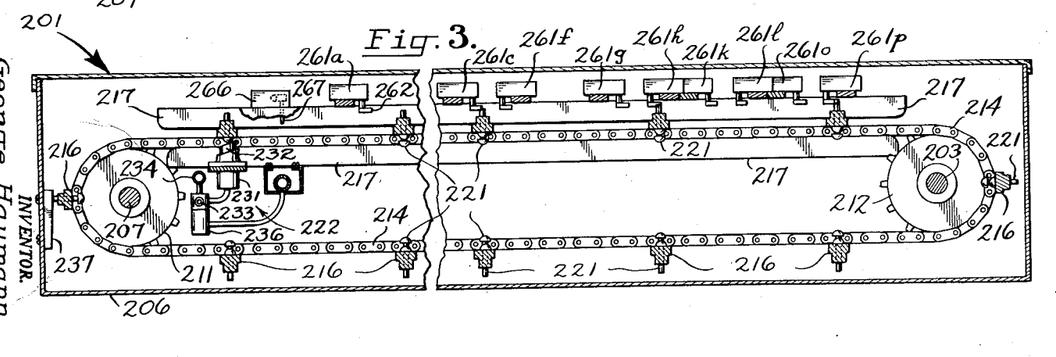
Fig. 3 is a section view along the line 3—3 in Fig. 2.

Referring now in particular to Figs. 1, 2, and 3, regulator unit 201 comprises a casing 206 having rotatably mounted at one of its ends a regulator shaft 203. Regulator shaft 203 is connected as by chain 204 to be driven by shaft 23 of transfer mechanism 12. At the other end of the casing and rotatably mounted in the casing is a second shaft 207. Adjacent one end of shafts 207 and 203, and affixed to the shafts, are a set of sprockets 208 and 209, and adjacent the other end of the shafts and affixed to the shafts are another set of sprockets 211 and 212. A pair of chains 213 and 214 reeved about sprockets 208, 209 and sprockets 211, 212, respectively, transmit drive from the regulator shaft to shaft 207. Since shaft 203 is chain driven by shaft 23, chains 213 and 214 are driven conjointly with and at a speed related to the speed of the chains in transfer mechanisms 12, 13, and 14.

Carried by chains 213, 214 and extending between the chains at spaced intervals along the chains are a series of bar members 216. These bar members are carried in a continuous path through the control unit by chains 213, 214. Guide rails 217 on either side of casing 206, riding against upper and lower surfaces of the outer ends of the bar members, maintain the bar members in a more or less horizontal plane as they travel across the casing.

The spacing of the bar members along chains 213, 214 and the speed of the chains through the control unit are selected so that the successive control bars members move through the casing at the same rate as successive rows of lugs carried by the chains of the transfer mechanisms move down the processing line. In this manner, each board carried down the processing line has a corresponding bar member moving through the control unit governing the work operations performed on the board.

Slidably mounted for reciprocation up and down in each of the bar members are a series or a bank of pins or operator means 221. These pins are frictionally retained in the bar members, the pins having rounded inner ends protruding inwardly of the inner surface of the bar members. Referring to Fig. 2, in the embodiment illustrated, each of the bar members has seven pins. Each pin of a bar member is longitudinally aligned with a corresponding pin carried by each of the remaining bar members, each series of aligned pins in the unit constituting a channel in the unit. The pins of each channel move through the same path through the unit. There are seven series of aligned pins in the embodiment illustrated in Fig. 2, making up seven channels in the unit. The channels are indicated in Fig. 2 by the dotted lines labeled $C_1$–$C_7$.

Arranged in a bank at the rear end of the regulator unit slightly forwardly of sprockets 213, 214 are a series of fluid motors 222–228. Each fluid motor is operable to engage, when extended, the pins of one of the channels of the regulator unit. Upon engaging the inner, rounded ends of a pin, the pin is moved upwardly in the bar member with its opposite end protruding above the upper surface of the bar member.

Each of the fluid motors 222–228 has a cylinder portion indicated at 231 and a rod element 232 slidably mounted for reciprocation to-and-fro in cylinder portion 231. The upper end of rod element 232 is beveled and operable, when extended, to come into contact with the lower, rounded ends of a pin, the beveled end sliding the pin upwardly so that it occupies its extended or energizing position. Rod elements 232 occupy their extended position when fluid pressure is admitted to cylinder 231 and drop to a retracted position when pressure fluid is exhausted from the cylinder. Inlet and exhaust connections are provided for each cylinder through conduits such as conduit 233 and 234. A solenoid-operated valve, indicated at 236 for motor 222, controls the inlet and exhaust connections for the motors.

Each pin 221 remains in an extended or energizing position until the bar member carrying the pin travels around the rear end of the regulator unit to come in contact with a return plate 237 fastened to the rear wall of the casing and extending transversely across the casing. The return plate has a beveled forward edge operable to slide against and wedge inwardly any pin which occupies its extended position. When a bar member leaves return plate 237, each pin carried by the bar member occupies its retracted position, readying the pin to be moved to its extended or energizing position when the bar member moves over the bank of fluid motors 222–228.

Spaced at intervals along the top travel of the chains carrying the bar members are rows 250, 251a, 251b, 252a, 252b, 253a, 253b, 254a and 254b of interceptor switches or sensor means 261a–261p. Each interceptor switch is positioned in the path of travel of a pin 221, when the pin is in its energizing position, and has a pivotable finger 262 engaged by a pin when a pin is extended so as to be swung about its pivot connection and operate a switch mechanism. Interceptor switches 261a–261p regulate the circuits controlling the motors operating the work stations in the processing line.

The row of interceptor switches 250 controls the bank of trimmer saws in work station 61, rows 251a and 251b control motor 131 of work station 62, rows 252a and 252b control motor 161 of work station 63, rows 253a and 253b control the bank of grade stampers in work station 64, and rows 254a and 254b control motor 191 operating the drop sorting mechanism of work station 65. The rows are spaced along the control unit so that the interceptor switches making up a row are engaged by a pin carried by a bar member at a time co-ordinated with the movement of a board through the work station controlled by the row.

Referring again to Figs. 2 and 3, in the path of the bar members as they move through the regulator unit, slightly in front of the bank of fluid motors, is a fluid motor return switch 266 having a pivotable switch finger 267. Finger 267 is engaged by a bar member in its movement through the unit and is operable to open switch 266 when engaged by a bar member so as to de-energize the solenoids of the solenoid valves controlling fluid motors 222–228. When the solenoids are de-energized, rod elements 232 of the fluid motors are retracted to their lowered position, preparing the fluid motors for reactivation prior to movement of a subsequent bar member over the bank of motors.

With reference now in particular to Figs. 4 and 5, selector unit 202 of the control mechanism includes a casing 271 in which are mounted a series of independently actuatable selector members or keys 272a–272g and a series of selectively adjustable coupling switches 273a–273h. Each of the keys is pivoted on a pivot rod 274 and has a lower dependent arm 275 functioning to operate a switch indicated generally in Fig. 5 at 276 when the key is depressed. Each of the selector keys, when depressed to actuate a switch, causes the solenoid valve of one of the fluid motors 222–228 to be energized and, in this manner, the rod element of a fluid motor to move to its extended position. When a bar member 216 then moves over the fluid motor, the pin in one of the channels will then be moved to an energizing position.

Coupling switches 273a–273h are provided to connect various combinations of the solenoid valves regulating motors 222–228 so that combinations of the solenoid valves may be energized by depressing a single selector key. By such an arrangement, the pins of two or more channels may be moved to an energizing position when a bar member moves over the bank of fluid motors 222–228 without actuating a multiple number of selector keys. The coupling switches are noncanceling, the various solenoid valves remaining interconnected by a coupling switch until the coupling switch is manually readjusted to another position. Return plate 237, on the other hand, acts as a canceling means, canceling periodically the adjustment to an energizing position of pins 121 brought about by depressing a selector key. This follows from the fact that all the pins of a control bar member are returned to their rest or base position when a control bar member passes the return plate.

Figure 9:
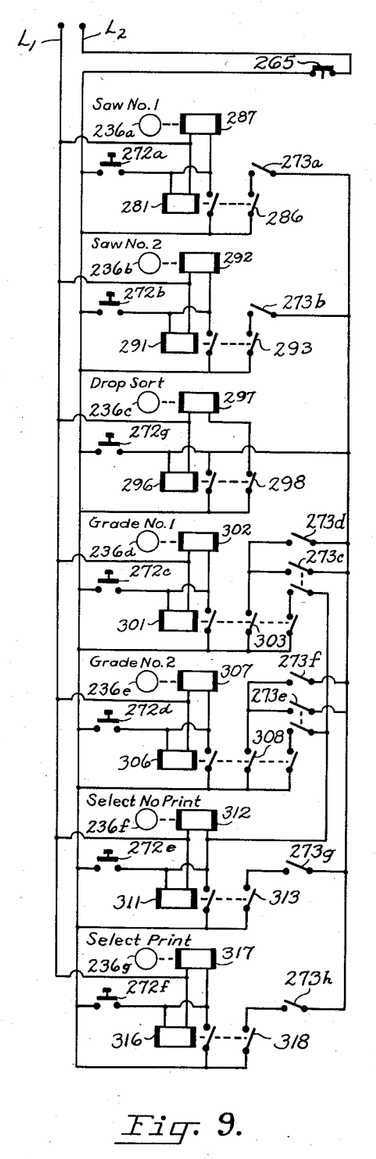
Figs. 9 and 10 illustrate circuits used in the control mechanism of this invention.
Figure 10:
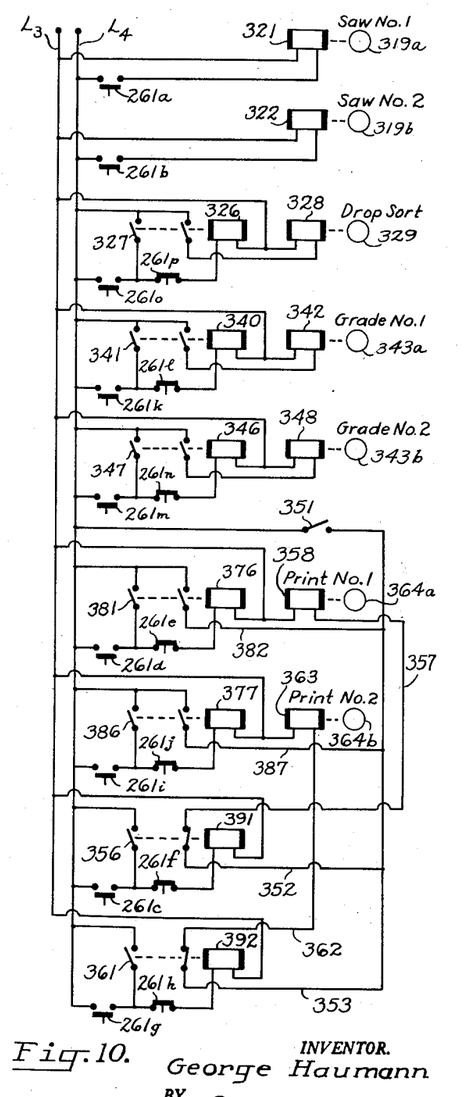

Circuits such as may be used for the control mechanism of this invention are illustrated diagrammatically in Figs. 9 and 10. In Fig. 9, a circuit for the selector keys and the coupling switches is illustrated, whereas in Fig. 10, a circuit for the solenoid valves controlling the motors in the various work stations of the processing line is illustrated. Two circuits are shown since, as brought out in the above discussion, it should be understood that the selector keys and coupling switches function only to control the energizing of the solenoid valves for fluid motors 222–228 whereby a pin or pins of a control bar member may be set in an energizing position, the motors of work stations 61–65 being controlled by movement of these pins through the regulator unit into engagement with the interceptor switches.

In the embodiment illustrated, for reasons of simplicity the selector keys are shown operating only two trimmer saws and only two grade stamping mechanisms. It is obvious that a greater number of grade stamping mechanisms or trimmer saws may be regulated by the control mechanism of this invention by increasing the number of channels in the regulator unit and by appropriately multiplying the circuits for the trimmer saws and grade stamping mechanisms illustrated in Figs. 9 and 10.

Referring to Figs. 2 and 4, selector keys 272a and 272b regulate the solenoid valves for the motors adjusting the pins in channels $C_1$ and $C_2$ which activate the trimmer saws. Selector keys 272c and 272d regulate the solenoid valves adjusting the pins in channels $C_5$ and $C_6$ which activate the grade stamping machines. In a similar manner, selector key 272g regulates the solenoid valve of channel $C_7$ which controls the drop sorting mechanism in the processing line. The remaining keys, keys 272e and 272f, are for adjusting the pins in channels $C_3$ and $C_4$ controlling the end printers in the line.

With respect to the coupling switches, coupling switches 273a and 273b, when closed, connect the solenoid valves for the motors in channels $C_1$ and $C_7$ and the motors in channels $C_2$ and $C_7$, respectively, so that when selector key 272a is depressed, a pin in channel $C_1$ controlling a saw and a pin in channel $C_7$ controlling the drop sorter will be moved by the fluid motors to an energizing position, and when key 272b is depressed, a pin in channel $C_2$ controlling another saw and a pin in channel $C_7$ controlling the drop sorter will be moved by the fluid motors to an energizing position. Coupling switches 273d and 273f connect the solenoid valves for the motors in channels $C_5$ and $C_7$ and channels $C_6$ and $C_7$ whereby one of the grade stamping keys 272c or 272d is depressed, a pin controlling a grade stamper is moved to an energizing position together with a pin controlling the drop sorting mechanism. Similarly, coupling switches 273c and 273e couple together the solenoid valves for the motors in channels $C_5$, $C_7$, and $C_4$ and channels $C_6$, $C_7$, and $C_4$, respectively, enabling pins controlling the end printers and the drop sorter mechanism to be moved to an energizing position together with a pin controlling a grade stamper upon depressing one of the grade stamper keys 272c or 272d. Coupling switches 273g and 273h interconnect the energizing of the motors in channels $C_3$ and $C_4$ with the energizing of the motor in channel $C_7$ whereby depressing one of the keys 272e or 272f controlling the end printers also serves to energize a motor adjusting a pin in channel $C_7$ which activates the drop sort mechanism.

With reference to Fig. 9 for an explanation of the circuit for the selector keys and coupling switches, key 272a regulating one of the trimmer saws, when depressed, closes a switch connecting a pair of solenoids 281 and 287 to a pair of line conductors $L_1$ and $L_2$. Solenoids 281 and 287, as well as the other solenoids discussed herein, are conventional, having movable armatures which are spring biased to one extreme position so as to describe a to-and-fro movement when energized and de-energized, respectively.

Solenoid 281 is ganged to and, when energized, closes a double switch 286, one of the switch points of switch 286 serving to keep solenoids 281, 287 energized upon the release of key 272a. Solenoid 287 is ganged to a solenoid valve 236a controlling the inlet and exhaust connections of motor 222 in channel $C_1$ of the regulator unit. When solenoid 287 is energized, valve 236a operates to cause the rod of motor 222 to move under fluid pressure to an extended position where it is in a position to contact a pin moved thereover by one of the control bar members 216. When return switch 265 is opened by movement of a control bar member past finger 267, solenoids 281, 287 are de-energized, the rod element of motor 222 subsequently returning to a retracted position. Release switch 265 is part of the circuit for all of the keys discussed hereinbelow.

In a similar manner, key 272b, regulating another trimmer saw, is operable, when closed, to energize a pair of solenoids 291 and 292. Solenoid 291 is ganged to a double switch 293 having one switch point which holds solenoid 292 energized after key 272b is released. Solenoid 292, like solenoid 287, is ganged to a solenoid valve 236b which regulates motor 223 in channel $C_2$ of the regulator control unit.

The drop sorter mechanism, which is regulated by pins traveling along channel $C_7$ in the regulator unit, is controlled by key 272g. Key 272g, when depressed, energizes a pair of solenoids 296 and 297. Solenoid 296 is ganged to and, when energized, closes a double switch 298. One of the switch points of double switch 298 holds solenoid 297 energized when key 272g is released. Solenoid 297 is ganged to a valve 236c which controls fluid motor 228 in channel $C_7$ of the regulator unit.

Coupling switch 273a connects, when closed, solenoids 296 and 297 with one of the switch contacts of double switch 286. Thus, when solenoid 281 is energized so as to close double switch 286, solenoids 296 and 297 will also become energized if switch 273a is closed. Similarly, coupling switch 273b connects, when closed, solenoids 296 and 297 with one of the switch contacts of double switch 293.

As stated hereinabove, the grade stampers are governed by pins traveling in channels $C_5$ and $C_6$ controlled, in turn, by keys 272c and 272d. Key 272c, when depressed, closes a switch connecting solenoids 301 and 302 between line conductors $L_1$ and $L_2$, solenoid 301 being ganged to a triple switch 303. One of the switch points of switch 303 operates to hold solenoids 302 energized upon the release of key 272C. Solenoid 302 is ganged to solenoid valve 236d controlling inlet and exhaust connections to motor 226 of channel $C_5$. In a similar manner, key 272d, when depressed, energizes a pair of solenoids 306 and 307, solenoid 306 being ganged to a triple switch 308. One of the points of switch 308 acts to hold solenoids 306, 307 energized upon the release of key 272d. Solenoid 307 is ganged to a solenoid valve 236e controlling inlet and exhaust connections to motor 227 of channel $C_6$.

Coupling switch 273d is operable, when closed, to make a connection between one of the switch contacts of triple switch 303, and solenoids 296 and 297 governing the pins in channel $C_7$ and the drop sort mechanism. In this manner, when switch 273d is closed, depressing key 272c and energizing solenoids 301, 302 also operates to energize solenoids 296, 297 so that the drop sort mechanism will be operated by pins in channel $C_7$. Coupling switch 273f performs a similar function for one of the switch contacts of triple switch 308.

In the embodiment herein illustrated, motors 131 and 161 of the end printers in work stations 62 and 63 on either side of the line are preset either in an extended position wherein both of the end printers are in position to engage the end of a board transported past the work stations, the printers occupying a print condition, or in a retracted position wherein both of the end printers are moved outwardly and out of contact with boards transported down the line, the printers occupying a no-print condition. Using such a system, the pins in channels $C_3$ and $C_4$ of the regulator unit are employed for altering the position of the end printers from their preset or preselected position. The pins in channel $C_4$ of the unit are operable, when moved to an energizing position, to adjust for a given board the printers from a print to a no-print position. The pins in channel $C_3$ of the unit are operable, when moved to an energizing position, to adjust for a given board the printers from a no-print to a print condition. Key 272e of the selector unit controls the solenoid valve regulating motor 225 and the pins in channel $C_4$. Key 272f of the unit controls the solenoid valve regulating motor 224 and the pins in channel $C_3$.

Referring again to Fig. 9, if selector key 272e is depressed, solenoids 311 and 312 are energized. Solenoid 311 is ganged to and closes, when energized, a double switch 313 having one switch point which, when closed, holds solenoids 311, 312 energized on release of key 272e. Solenoid 312 is ganged to a solenoid valve 236f controlling the operation of motor 225 in channel $C_4$. In a similar manner, key 272f, when depressed, energizes a pair of solenoids 316 and 317, solenoid 316 being ganged to a double switch 318 which includes a switch point holding solenoids 316, 317 energized on release of key 272f. Solenoid 317 is ganged to a solenoid valve 236g controlling the operation of motor 224 and the pins in channel $C_3$.

Coupling switches 273c and 273e are each double switches as can be seen in Fig. 9. Coupling switch 273c, when closed, makes a connection between one of the switch contacts of triple switch 303, and solenoids 311, 312 and 296, 297 governing the pins in channels $C_4$ and $C_7$. When switch 273c is closed, depressing key 272c also energizes these solenoids so that the drop sorter mechanism will be operated by pins in channel $C_7$ and the end printers will move from a print to a no-print position under the activation of pins in channel $C_4$. Coupling switch 273e, when closed, makes a connection between one of the switch contacts of triple switch 308 and solenoids 311, 312 and 296, 297, thereby connecting the operation of the solenoid valves and motors of channels $C_4$ and $C_7$ with actuation of key 272d.

Coupling switches 273g and 273h connect, when closed, one of the switch contacts of double switches 313 and 318, respectively, to solenoids 296, 297, enabling solenoids 296, 297 to be energized simultaneously with depressing keys 272e and 272f.

The foregoing portion of the control mechanism has been concerned with a construction employed for moving selected pins in channels $C_1$–$C_7$ from a retracted to an extended position whereby the pins selected are moved into a position to intercept or to engage interceptor switches positioned in their path. The pins of a control bar member are adjusted to an activating or energizing condition when the pins are moved over the bank of fluid motors 222–228. Actuation of the various motors in work stations 61–65 does not actually occur until the pins strike or engage the interceptor switches which are connected in the control circuit for the motors of the various work stations.

Each motor 106 for unlatching one of the trimmer saws so as to place it in operative position is controlled by a solenoid valve which regulates the inlet and exhaust connections for the motor. This invention has been described in connection with the control of a pair of trimmer saws, and the solenoid valves for these motors are indicated in Fig. 10 at 319a and 319b. Interceptor switches 261a and 261b, located in the row of interceptor switches 250 of the regulator unit, control these saws. The saws are located in work station 61 which is the first work station through which a board is transported, and, consequently, interceptor switches 261a and 261b are in the first row of interceptor switches of the regulator unit. Interceptor switch 261a, when closed by a pin engaging the switch, connects to a pair of line conductors $L_3$ and $L_4$, a solenoid 321, which is ganged to valve 319a, controlling the inlet and exhaust connections of a motor 106. Solenoid 321, when energized, adjusts valve 319a so that one of the saws is unlatched and placed in operative position. It will be remembered that each of the trimmer saws can be set in operative position by only a momentary activation of motor 106, and for this reason a single interceptor switch may be employed in controlling the operation of a trimmer saw. In a similar manner, an interceptor switch 261b, when closed, energizes a solenoid 322 which is ganged to valve 319b controlling the fluid motor 106 of another trimmer saw.

The drop sorting mechanism of work station 65, which is at the foremost end of the processing line, includes a motor 191 which, when extended, raises arms 186 to permit a board to pass down chute 188 and, when retracted, lowers arms 186 so that a board passes over the arms onto belts 41. Interceptor switches 261o and 261p in rows 254a and 254b, located in the path of pins in channel $C_7$, control the operation of this motor, rows 254a and 254b being at the foremost end of the unit illustrated in Fig. 2. Switch 261o normally remains open whereas switch 261p normally remains closed. When interceptor switch 261o is closed by a pin engaging the switch, a connection is made from conductor $L_4$ through interceptor switches 261o and 261p and a solenoid 326 to conductor $L_3$, and solenoid 326 is energized. Solenoid 326 is ganged to a double switch 327. One of the switch points of switch 327 serves to hold solenoid 326 energized after switch 261o opens by a pin moving past the switch, and the other of the switch points, when closed, makes a circuit for a solenoid 328 which is ganged to a solenoid valve 329 regulating motor 191 of the drop sorter mechanism. When solenoid 328 is energized, valve 329 causes motor 191 of the drop sorter mechanism to move to an extended position. The motor remains in this position until a pin in channel $C_7$ moves forwardly in the unit and engages interceptor switch 261p, at which time solenoids 326 and 328 become de-energized and the inlet and exhaust connections for motor 191 are reversed so that the motor moves to its retracted position. By using a pair of interceptor switches, motor 191 may be kept in an extended position for a long enough time interval to permit a board traveling through the line to press under the arms of the drop sorting mechanism and down chute 188.

The circuit for each grade stamping mechanism is similar to the circuit just described for the drop sorting mechanism. Each of the grade stampers includes a motor 181 which, in its extended position, moves the die member of the grade stamper into contact with the top of a board passing thereunder and, when retracted, lifts the grade stamper away from contact with a board. Interceptor switches 261k and 261l in channel $C_5$ control the operation of one of the grade stampers whereas interceptor units 261m and 261n in channel $C_6$ control the operation of the other grade stamper. When a pin, in its extended position, moves down through the unit in channel $C_5$, the pin first encounters interceptor switch 261k closing the switch. When the switch is closed, current passes from conductor $L_4$ through switch 261k, normally closed interceptor switch 261l, and through a solenoid 340 to conductor $L_3$. Solenoid 340 is ganged to a double switch 341. Switch 341 includes one switch point which acts to hold solenoid 340 energized, and another switch contact which closes a circuit for energizing a solenoid 342. Solenoid 342 is ganged to a solenoid valve 343a regulating inlet and exhaust connections to a motor 181 for one of the grade stampers. When energized, solenoid 342 causes motor 181 to go to its extended position. Solenoid 342 remains energized and motor 181 remains in its extended position until the pin in channel $C_5$ continues in its path and energizes interceptor switch 261l, at which time switch 261l is opened and solenoid 342 becomes de-energized. Similarly, with respect to channel $C_6$, interceptor switch 261m, when closed, functions to energize a solenoid 346 ganged to a double switch 347. Closing of double switch 347 causes a solenoid 348 to become energized, and movement of a solenoid valve 343b controlling another motor 181 for another grade stamper. Solenoid 348 is de-energized upon a pin engaging and opening interceptor switch 261n.

As discussed hereinabove, in the embodiment illustrated both the end printers are preset so as to be maintained either in a print or a no-print condition. The switch controlling either maintained printing or maintained no-printing is switch 351, illustrated as a toggle switch in Fig. 4.

Referring to Fig. 10, switch 351 connects, when closed, conductor $L_4$ with a pair of conductors 352 and 353. Conductor 352 is connected by one of the switch points of a double switch 356 to a conductor 357, conductor 357 being connected to a solenoid 358 which is connected at its other end to conductor $L_3$. Similarly, conductor 353 is connected by one of the switch points of a double switch 361 to a conductor 362, conductor 362 being connected to a solenoid 363 which is connected at its other end to conductor $L_3$. The switch points just described of double switches 356 and 361 are normally in a closed position.

The end printers are maintained in a print position when switch 351 is open and solenoids 358 and 363 are unenergized. Solenoid 358 is ganged to a solenoid valve 364a regulating motor 131 of the end printer in work station 62, and solenoid 363 is ganged to a solenoid valve 364b regulating motor 161 of the end printer in work station 63. When de-energized, solenoids 358, 363 are operable to adjust the inlet and exhaust connections for motors 131, 161 so that the motors are in an extended position and the end printers moved in and out by these motors are positioned adjacent boards passing down the processing line.

A maintained no-print condition is brought about by closing switch 351. Switch 351, when closed, completes the circuit for solenoids 358 and 363 so that they become energized. When energized, valves 364a and 364b reverse the inlet and exhaust connection for motors 131, 161, causing the end printers of work stations 62, 63 to move away from the processing line and the die members of these printers to be positioned so as to be out of contact with boards transported past the work stations 62, 63.

As stated above, rows of interceptor switches 251a and 251b regulate the end printer of work station 62, and rows of interceptor switches 252a and 252b regulate the end printer of work station 63. A pin in its extended position, moving down channel $C_3$, operates to produce a temporary print condition, when switch 351 is set for maintained no-printing, first in work station 62 and then in work station 63 by engaging first the interceptor switches in rows 251a and 251b and then the interceptor switches in rows 252a and 252b. The print condition lasts only for so long a time as is necessary for a board to pass the work station. A pin in its extended position, moving down channel $C_4$, on the other hand, operates to bring about a temporary no-print condition when switch 351 is set for maintained printing.

There are four interceptor switches, switches 261d, 261e, 261i, and 261j, placed in the path of a pin moving down channel $C_4$. Referring to Fig. 10, interceptor switch 261d, when closed by a pin moving in its extended position, connects conductor $L_4$ to normally closed interceptor switch 261e and a solenoid 376, solenoid 376 being connected at its other end to conductor $L_3$. Similarly, interceptor switch 261i, when closed, connects conductor $L_4$ to normally closed interceptor switch 261j and a solenoid 377, solenoid 377 being connected at its other end to conductor $L_3$. A pin in its extended position in channel $C_4$ first engages interceptor switch 261d to close the switch and energize solenoid 376. Solenoid 376 is ganged to a double switch 381. One of the switch points of switch 381 acts to hold solenoid 376 energized, and the other of the switch points of the switch is connected through conductors 382, 352, and 357 to solenoid 358. As a consequence, closing of interceptor switch 261d functions to energize solenoid 358 as well as solenoid 376, and the printer of station 62 controlled by valve 364a is moved from a print to a no-print condition. Further movement of a pin in channel $C_4$ causes the pin to engage interceptor switch 261e, which is normally closed, but opened when the pin engages the switch. This results in solenoid 358 becoming de-energized and a reversal of the inlet and exhaust connections for motor 131 of work station 62.

Continued forward movement of the pin in channel $C_4$ causes the pin to engage interceptor switch 261i to close the switch and energize solenoid 377. Solenoid 377 is ganged to a double switch 386, having one switch point holding solenoid 377 energized and another switch point connected through conductors 387, 353, and 362, to solenoid 363. Thus, closing interceptor switch 261i functions to energize solenoid 363 as well as solenoid 377, and the end printer of work station 63 is moved from a print to a no-print condition. Continued movement of a pin in the channel causes the pin to engage interceptor switch 261j and open the interceptor switch, thereby to de-energize solenoids 377, 363.

Channel $C_3$ controls the select no-printing of boards when the end printers are set in a maintained print condition, i.e., when switch 351 is closed and solenoid 358 is normally energized. There are four interceptor switches, switches 261c, 261f, 261g, and 261h in this channel Referring to Fig. 10, interceptor switch 261c, when closed, connects conductor $L_4$ through interceptor switch 261f to a solenoid 391. Solenoid 391 has its other end connected to conductor $L_3$. Solenoid 391 is ganged to double switch 356 as discussed hereinabove. When interceptor switch 261c is closed by a pin engaging the switch, solenoid 391 is energized, thereby closing a switch point of double switch 356 which acts to hold solenoid 391 energized and opening a switch point of double switch 356 which connects conductors 352 and 357. In this way, solenoid 358 is de-energized, and valve 364a adjusts motor 131 of work station 62 to move the end printer to a print condition. This condition lasts until interceptor switch 261f is engaged and opened which functions to de-energize solenoid 391 and re-energize solenoid 358. Interceptor switches 261g and 261h perform similar functions with respect to work station 63. Interceptor switch 261g, when closed by a pin engaging the switch, connects conductor $L_4$ through normally closed switch 261h to a solenoid 392 which is ganged to double switch 361 already discussed above. Energizing solenoid 392 operates to de-energize normally energized solenoid 363, the parts returning to their original condition when interceptor switch 261h is engaged by a pin moving through the regulator unit.

In operation, the control mechanism described enables the work motors of a processing line to be readily set for activation as required by each particular board transported through the line. Considering a particular board, if all boards trimmed by the saw controlled by valve 236a are to be dropped out by the drop sorter mechanism and all boards trimmed by the saw controlled by valve 236b are to travel onto belts 41, coupling switch 273a may be closed and coupling switch 273b may be left open. On depressing key 272a, the trimmer saw controlled by valve 236a will be activated when a board reaches work station 61, and the board will be trimmed the appropriate length. On reaching the drop sorter, the motor for this work station will be activated, and the board will drop out of the line. Both operations are controlled by depressing a single selector key. On the other hand, if key 272b is closed, the only motor activated as the board passes down the line will be the motor controlled by valve 236b in work station 61.

The pins in channels $C_1$ and $C_2$ controlling the trimmer saws, in channels $C_5$ and $C_6$ controlling the grade stampers, in channel $C_7$ controlling the drop sorter mechanism, and in channel $C_4$ controlling the select no-printing of a board constitute control means for the various motors of the work stations which are operable to activate the motors when the pins are adjusted to an extended or an activating condition so as to be in position to engage the interceptor switches regulating the motors. Actuation of the selector keys or members controlling the motors which operate to push the pins to an extended position serves to adjust the pins in these channels to an activating condition. The pins of each control bar member are moved to a retracted position when the bar member moves past plate 237, each bar member moving past plate 237 after the piece of lumber whose movement through the processing line had been co-ordinated with the bar member has left the processing line. In this manner, plate 237 functions to periodically cancel the adjustment to an activating condition of the pins or control means for the motors.

The various coupling switches discussed connect for adjustment to an activating condition the pins for combinations of the motors in the work stations. The coupling switches are noncanceling, i.e., they remain set until manually adjusted to another position. Thus, for any given run, appropriate coupling switches may be set to enable successive boards of similar properties to receive similar treatment as succeeding boards, the treatment rendered a board being selected by actuating a single selector key.

The pins of channel $C_4$ may be controlled by selector keys 272c or 272d governing the grade stamping machines by closing coupling switches 173c or 273e. The pins of this channel activate the motors of work station 62, 63 to bring about select no-printing of a board when the line is set for maintained printing. If one of these coupling switches is closed, for example switch 273e, and switch 351 is set for maintained printing, each time grade stamping key 272d is actuated, a board on passing through the line will be appropriately grade stamped and will be transported through work stations 62, 63 without receiving an end print. The control mechanism described enables this condition to be tempeorarily changed in the event an unusual board is processed. The pins of channel $C_3$, which control select printing, are operable, when extended, to override or annul the effect of closing coupling switch 273e or 273c as these pins function to deenergize solenoids 358 and 363 controlling the end printers regardless of the condition of the pins in channel $C_4$. The pins of channel $C_3$, which are moved to a retracted position or cancelled on moving past return plate 237, are operable therefore to remove motors of a combination of motors coupled by a coupling switch from activation with the combination It should be obvious that other types of work stations may be incorporated in the processing line other than those described. Also, coupling switches for combinations other than those discussed are possible as well as arrangements for removing various other work motors temporarily from these combinations.

It is claimed and desired to secure by Letters Patent:

1. In a lumber processing line having plural work stations spaced therealong, each having a work mechanism for performing a work operation on lumber and a work motor powering the work mechanism, control mechanism for regulating the work motors comprising a sensor means for each motor operable when actuated to activate the motor, an operator means for each sensor means adjustable between an activating and a nonactivating condition and means mounting the operator means producing recurrently passes of the same past its sensor means, each operator means being operable when in an activating condition to actuate its sensor means on moving past the latter, a selector member for each operator means for adjusting the operator means to an activating condition, means automatically canceling the adjustment to an activating condition of each operator means after completion of a pass past its sensor means, and selectively adjustable noncanceling coupling means for operatively interconnecting selected ones of said selector members whereby selected combinations of said operator means may be adjusted to an activating condition upon actuation of one of the selector members.

2. In a lumber processing line having plural work stations spaced therealong, each having a work mechanism for performing a work operation on lumber and a work motor powering the work mechanism, control mechanism for regulating the work motors comprising a sensor means for each motor operable when actuated to activate the motor, an operator means for each sensor means adjustable between an activating and a nonactivating condition and means mounting the operator means producing recurrently passes of the same past its sensor means, each operator means being operable when in an activating condition to actuate its sensor means on moving past the latter, a selector member for each operator means for adjusting the operator means to an activating condition, means automatically canceling the adjustment to an activating condition of each operator means after completion of a pass past its sensor means, selectively adjustable non-canceling coupling means for operatively interconnecting selected ones of said selector members whereby selected combinations of said operator means may be adjusted to an activating condition upon actuation of one of the selector members and thus combinations of motors may be coupled together for actuation, and means periodically canceled for removing a motor in a combination coupled by said coupling means from activation with the combination.

3. In a lumber processing line having an inspection station followed by plural work stations spaced along the processing line, each work station having a work mechanism for performing a work operation on lumber and a work motor powering the work mechanism, said line also having a conveyer for transporting lumber along the line, control mechanism for regulating the work motors comprising a sensor means for each work motor operable when actuated to activate the motor, the several sensor means being disposed along a path and spaced from each other in said path at distances related to the spacing of the work stations along said processing line, a bank of plural operator means, one for each sensor means, and means mounting the bank of operator means producing recurrently passes of the same past the several sensor means and at a speed related to the speed of the conveyer, each operator means being adjustable between an activating and a nonactivating condition and in an activating condition being operable to actuate its sensor means on movement past the latter, a selector member for each operator means for adjusting the operator means to an activating condition at the time a lumber piece passes the inspection station, means automatically canceling the adjustment to an activating condition of each operator means after each completes a pass past its sensor means, and selectively adjustable noncanceling coupling means for operatively interconnecting selected ones of said selector members whereby selected combinations of said operator means may be adjusted to an activating condition upon actuation of one of the selector members.

4. In a lumber processing line having an inspection station followed by plural work stations spaced along the processing line, each work station having a work mechanism for performing a work operation on lumber and a work motor powering the work mechanism, said line also having a conveyer for transporting lumber along the line, control mechanism for regulating the work motors comprising a sensor means for each work motor operable when actuated to activate the motor, the several sensor means being disposed along a path and spaced from each other in said path at distances related to the spacing of the work stations along said processing line, a bank of plural operator means, one for each sensor means, and means mounting the bank of operator means producing recurrently passes of the same past the several sensor means and at a rate of speed related to the speed of the conveyer, each operator means being ajustable between an activating and a nonactivating condition and being operable in an activating condition to actuate its sensor means on movement past the latter, a selector member for each operator means for adjusting the operator means to an activating condition at the time a lumber piece passes the inspection station, means automatically canceling the adjustment to an activating condition of each operator means after each completes a pass past its sensor means, selectively adjustable noncanceling coupling means for operatively interconnecting selected ones of said selector members whereby selected combinations of said operator means may be adjusted to an activating condition upon activation of one of the selector members and thus combinations of motors are coupled together for actuation, and means periodically canceled for removing a motor in a combination coupled by the coupling means from activation with the combination.

5. In a lumber processing line having plural work stations spaced therealong, each having a work mechanism for performing a work operation on lumber and a work motor powering the work mechanism, control mechanism for regulating the work motors comprising a control switch for each motor and circuit means connecting the control switch to the motor whereby actuation of the control switch activates the motor, operator means for each control switch adjustable between an activating and a nonactivating condition and means mounting the operator means producing recurrently passes of the same past its control switch, each operator means being operable when in an activating condition to actuate its control switch on movement past the latter, a key for each operator means and a solenoid connected to the key actuated by actuation of the key, the solenoid when actuated being operable to adjust the operator means to an activating condition, means automatically canceling the adjustment to an activating condition of each operator means after completion of a pass past its control switch, and selectively adjustable noncanceling coupling means for operatively interconnecting selected ones of said keys whereby selected combinations of said operator means may be adjusted to an activating condition upon actuation of one key.

6. In a lumber processing line having an inspection station followed by plural work stations spaced along the processing line, each work station having a work mechanism for performing a work operation on lumber and a work motor powering the work mechanism, said processing line also having a conveyer for transporting lumber along the line, control mechanism for regulating the work motors comprising a control switch for each motor operable when actuated to activate the motor, said control switches being disposed along a path and spaced along the path at distances related to the spacing of the work stations along the processing line, a bank of plural operator means, one for each control switch, and means mounting the bank producing recurrently passes of the same past the several switch means and at a speed related to the speed of the conveyer, each operator means being adjustable between an activating and a nonactivating condition and operable in an activating condition to actuate its control switch means on movement past the same, a key for each operator means and a solenoid connected to the key so as to be actuated by actuation of the key, the solenoid when actuated being operable to adjust the operator means to an activating condition, means automatically canceling the adjustment to an activating condition of each operator means after completion of a pass past its switch means, and selectively adjustable noncanceling coupling means for operatively interconnecting selected one of the keys whereby selected combinations of the operator means may be adjusted to an activating condition upon actuation of one of the keys.

7. In a lumber processing line having an inspection station followed by plural work stations spaced along the processing line, each work station having a work mechanism for performing a work operation on lumber and a work motor powering the work mechanism, said line also having a conveyer transporting lumber along the line, control mechanism for regulating the work motors comprising a switch for each motor operable when actuated to activate the motor, the several switches being disposed along a path and spaced from each other along the path at distances related to the spacing of the work stations along the processing line, plural banks of operator means spaced one after another and means mounting the several banks moving the banks periodically and recurrently in passes past the several switches, each bank of operator means having an operator means for each switch, each operator means being adjustable between an activating and a non-activating condition and in its activating condition being operable to actuate its switch on movement past the latter, remotely located keys, one for each operator means of a bank, for adjusting the operator means to an activating condition, means automatically canceling the adjustment to an activating condition of each operator means after movement in a complete pass past its switch, and selectively adjustable noncanceling coupling means operatively for connecting selected ones of said keys whereby selected combinations of the operator means are adjusted to an activating condition upon actuation of one of the keys.

References Cited in the file of this patent

UNITED STATES PATENTS

| | | |
|---|---|---|
| 1,279,721 | Lieber | Sept. 24, 1918 |
| 2,393,617 | De Spain | Jan. 29, 1946 |
| 2,616,501 | Smith | Nov. 4, 1952 |
| 2,711,197 | De Koning | June 21, 1955 |
| 2,714,407 | Pearson | Aug. 2, 1955 |
| 2,714,906 | Peterson | Aug. 9, 1955 |
| 2,745,446 | Deiry et al. | May 15, 1956 |
| 2,778,474 | De Koning | Jan. 22, 1957 |
| 2,793,662 | Oholm | May 28, 1957 |